INVENTOR.
LAWRENCE R. SPERBERG
BY
MARCUS L. BATES

United States Patent Office 3,554,027
Patented Jan. 12, 1971

3,554,027
METHOD OF CONTROLLING TIRE DURABILITY, SIMULATING CLIMATIC CONDITIONS, AND CONTROL OF OXIDATION RATES IN PNEUMATIC TIRES
Lawrence R. Sperberg, P.O. Box 12308,
El Paso, Tex. 79912
Continuation of application Ser. No. 601,275, Nov. 21, 1966. This application Apr. 4, 1969, Ser. No. 814,233
Int. Cl. G01m 17/02
U.S. Cl. 73—146
31 Claims

ABSTRACT OF THE DISCLOSURE

A method of controlling tire durability by controlling the percentage composition of oxidant contained in the inflating agent. The percentage composition of the oxidant may also be used to simulate climatic conditions wherein the effective oxidative degradation of the tire is caused to proceed at a rate equivalent to the rate expected at a geographical location different from the geographical location where the tire is being used and at seasons of the year different from the season where the testing is actually accomplished. This procedure also permits a rapid means of evaluation of tire liners and other tire body elements.

---

This application is a continuation of patent application Ser. No. 601,275, filed Nov. 21, 1966, now abandoned.

More particularly, this invention relates to a method of tire testing wherein an oxidant is purposely incorporated in the fill gas in a proportionate amount to thereby control the oxidative degradation during durability tests.

The term "durability" as used herein embraces failure of tires brought about by structural failure other than by wearing away of the tread stock.

During its life, a tire is subjected to an indefinite and almost unlimited amount of work that results in heat being generated. This heat ultimately results in the tire's failure due to the influence of the heat upon the oxidative degradation. The oxidative degradation of the tire is a distinct chemical reaction.

Arrhenius' theory of rates of chemical reactions states that for every 10° C. increase in temperature the reaction rate doubles. Chemical reaction rates are also influenced by the concentration of the reactants. Vulcanization is considered a chemical reaction. In many respects, the long time aging of a rubber product has many features which resembles a continuing vulcanization, but at a much lower rate due to the lower temperature conditions encountered in normal usage. Oxidation of rubber takes place during aging, and considerable laboratory work has been devoted to the study of oxidation as well as the amount of the oxidation reaction. This work has been primarily conducted by investigators studying the efficiency of certain anti-oxidants in resisting the oxidation reaction, with the general theory that anti-oxidants act as oxygen scavengers.

Heat is important primarily from the standpoint of its effect upon the oxidation rate and the subsequent oxidation state, although it is also recognized that heat influences the strength of the cords and rubber compositions used in the construction of the tires independently from its influence upon the oxidation rate and state. Since heat regulates tire failure habits, and since tires run at lower temperatures during the winter months when the ambient temperatures are cooler, some professional tire testers tend to apply greater loads on the tires in order to increase the relative heat build-up so that the tire will run at a higher temperature to offset the lower ambient temperatures, thereby simulating a more average absolute tire running temperature condition throughout the various seasons of the year.

In order to fully understand the oxidation degradation mechanisms that occur within a tire, it is necessary to discuss briefly the reasons for the useful life of a tire being terminated.

Tire life is terminated by three principal causes: (1) the tire is damaged in use by some external source generally referred to as a road hazard; (2) the tire is structurally deficient; and (3) the tire is removed from service with the tread worn away but with the tire body intact. Road hazard failures generally fall into the category of cuts or bruise breaks. Structurally deficient tires cover the entire gamut of deficiencies ranging from gross to infinitely small. It is the opinion of many technically oriented tire experts that it is a virtual impossibility to build absolutely perfect tires. Therefore tires that have gross deficiencies resulting from some mishap in the manufacturing operation fail at an early mileage with little tread being worn away, and with the exact cause of failure being readily identifiable. Other tires with smaller deficiencies due to manufacturing mishaps or to minor improper design characteristics fail at higher mileages and with appreciable tread still remaining. The remainder of the tires that fail with very little tread remaining are generally said to have died of old age, but in reality their cause of failure can be attributed to some minor structural deficiency that required a good many miles before the effect of the deficiency became evident on the failure mechanism.

Old age failures of tires are almost universally due to separations occurring within the tire. A separation type failure simply denotes a failure wherein the tread separates from the tire body or wherein the individual plies of the tire body separate from each other.

A tire that fails when the tread lifts up from the cord body is generally referred to as a "tread separation" or most generally, simply as a "separation." A tire that fails due to the individual cord planes separating from each other is generally referred to as a "ply separation." A ply separation may occur in the sidewall, the shoulder, the crown, or the bead. If a ply separation occurs at or near the bead within the bead turn-up area, it is generally referred to as a "bead separation."

Separations may occur between rubber interfaces, or they may occur at the interface between the cord and the rubber insulation compound. Since practically all tire cord is dipped, or treated in some manner where the treating agent penetrates between the individual fibers making up the cord to thereby provide an effective bond between the cord itself and the rubber insulation or body compounds, when separations occur between the interface of the cord and the rubber insulation compound, the separation is generally referred to as a dip coat, or a skim coat separation. Separations of this type are characterized by the cords themselves appearing bright and shiny with a minimum of rubber compound adhering thereto.

All old age separations in tires start from the inside air chamber and work out to the tire surface and are due principally to the deterioration of the elements of the tire body that include the rubber compounds employed, the cord, the cord surface treatment that helps to bond the rubber insulation compound to the cord itself, the tread compound itself, and the liner compound or inner tube whose initial main objective is simply to contain the gaseous inflating agent.

Tires, while looking all alike, are actually quite distinct and different from each other. It is these differences that affect and influence the ultimate results of even the most carefully controlled road wear and durability test, or indoor wheel durability test. The differences between like tires are best appreciated by examining the force variation curves that characterize each tire. The specific force variation curves (radial and lateral) encompassing the 360° circumference of a tire represent the composite end result of all of the factors entering into the design and manufacture of the tire. Each tire has its own characteristic or fingerprint that denotes the tire's deviation from being perfect. As a tire rotates, under a given applied load, tire uniformity machines measure the change in the radial and lateral force variations. Lateral forces resolve into two sub-components—the strict lateral force variations due to tread irregularity and the conicity effect which results from an unbalanced cord planograph. It is possible to examine force variation charts and foretell with accuracy the relative wear rates of any section of the tire in comparison to any other section and also to foretell with accuracy the most probable point at which the tire will fail when the tire dies of middle or old age. Radial force variation curves show the change in load as the tire rotates. For example, the test may be conducted on a passenger tire with an effective load of 1000 pounds. The total radial force variation for the particular tire in question might be 28 lbs. The effective load at any particular tread arc of the tire thus varies, for example, from 986 lbs. to 1014 lbs. for a symmetrical non-uniform tire, or from 995 lbs. to 1023 lbs. for an unsymmetrical non-uniform tire, dependent upon the pecularities of the imperfection. Similarly, a lateral force variation of 12 lbs., for example, might be uniformly distributed with 6 lbs. on either side of the neutral axis which the tire tends to follow, or the entire 12 lbs. might tend to pull the tire to the left or to the right of the neutral axis for the entire extent of the 12 lb. variation. An unbalanced cord planograph (example: a 34° cord angle in one direction and a 35° cord angle in the other direction) will cause the tire to pull in one direction, resulting in a wiping wear from one shoulder to the other as if the tire had been toed in or out. The conicity wear effect exists generally for the entire circumference while the tread irregularity effect varies around the tire circumference. Applicant has found that the absolute rate of wear of tires that are tested under carefully controlled and regulated conditions is essentially proportional to the absolute magnitude of the radial and lateral force variations. Large force variations result in rapid rate of wear in comparison to small force variations which give slower rates of wear. Not only does the force variation data foretell the relative wear rate and durability to be anticipated, they also indicate the change in the rate of wear occurring circumferentially around the tire as well as the specific point of most probable failure. Specifically, whenever the radial force is increasing the wear rate increases to the maximum when the radial force begins to decrease, and this is followed with a decrease in the rate of wear paralleling the decrease in the radial force. It is further noted that the rate of change of the force variation also has a marked influence upon the absolute rate of wear—the greater the rate of force increase, the greater or faster the rate of wear; and the more rapid the drop in the force variation, the more slowly is the rate of wear. A tire having a 28 lb. force variation that is more or less symmetrical in the form of a sine wave for the 360° circumference wears at a somewhat slower rate than a similar tire also showing a 28 lb. absolute force variation where the 28 lb. force variation is concentrated in a small segment of the tire periphery. Lateral force variation (tread irregularity) is less important than radial force variation in influencing the absolute rate of wear, and is additive with radial force variation. Conicity lateral force wear is independent of an additive to radial force variation wear. When radial force variation is increasing, the influence of a lateral force variation, simultaneously with an increase in the radial force variation, results in a faster rate of wear than if there had been no lateral force variation at all. Similarly, when the radial force variation is decreasing, the influence of a simultaneous lateral force variation is minimized. The slope, acceleration or deceleration, of the force variation curve is the major factor in influencing the absolute rate of wear and is also the major factor in determining the precise location where the tire is most apt to fail. At points where the force variation is changing rapidly, there is a maximum energy change which results in a local hot spot which hastens the oxidative deterioration of the elements of the tire which in turn will cause the tire to fail at this point. Thus, an analysis of a failed tire in an area adjacent to the failed area may not reveal anything amiss with the cord, cord dip, or body compounds that have been employed in the tire's manufacture. When making comparisons of different type or construction tires, for either wear or durability, it is essential that similar tires be compared. That is, they must be similar in their basic radial and lateral force variation curves, not only in terms of absolute force variation, but also in terms of the rate of change of the force variation within the 360° circumference of the tire. This is particularly true for the durability characteristic of a tire, where variations in the acceleration or deceleration of forced change have a more pronounced effect upon durability than upon absolute rate of wear.

The main function of a liner or inner tube is to contain the gaseous inflating agent. In practical reality all commercial liners permit a flow of the inflation gases into and through the cord body. The permeability of liners can be varied by choice of rubbers and compounding ingredients used. Since all commercial liners or inner tubes do permit a small flow of the inflation gases through them, a constant source of oxygen is available within the tire body that feeds the oxidative degradation taking place when oxygen is present in the inflating agent. As a tire rolls it flexes at the contact area with the road and this flexing action generates heat. The heat balance within the tire depends upon the amount of flexing which regulates the quantity of heat generated, the hysteresis quality of the tire itself, the thermal conductivity of the rubber-cord material, and the heat transfer coefficient at the tire surface where heat is disseminated. The gas chamber of the tire thus not only becomes the reservoir that stores the inflating agent, but also the reservoir that involuntarily stores the heat that is generated as a consequence of the tires flexing. The influence of the heat is therefore greatest within the band ply of a tire and specifically at the flex area where the heat is generated. Tire failures due to old age are invariably the result of oxidative deterioration which is governed by the amount of oxygen present and the effective temperature. The actual point of failure within the tire depends upon the forces and stresses existent and quite obviously occurs at the weakest point within the tire. This may occur at the cord-rubber bond, between plies of the cord body, or between the tire tread and the cord body. A tire having a minor standard defect such as represented by a small radial and/or lateral force variation as measured on a conventional tire uniformity machine will generate slightly more heat at the point of imperfection (a local hot spot) which augments the oxidative degradation that in turn causes the failure to occur more quickly at this specific point of imperfection rather than at other points where the imperfections are of a lesser nature.

There is still another old age type failure that is separate and distinct from the foregoing type of separations. This type failure is associated with cracks starting in the grooves of the tread design where said cracks first extend to the cord body and then turn and work their way along the interface of the cord body and the tread until centifugal force fiinally tears the loose portions of the tread element from the tire body. This type failure is generally referred to as a chunk-out type failure due to tread cracking. Chunk-out failures are governed primarily by the quality and character of the tread compound itself but are also influenced by the oxidative degradation occurring as a result of oxygen migrating through the tire liner into the cord body and then into the under or solid portion of the tire tread.

The reaction rate for chemical processes, sometimes called chemical kinetics, is not an exact science, yet from a practical standpoint it is possible to formulate a generalization of the effect of oxygen upon the durability of a tire in the form of curves and charts, based on experimental data, of which the tables of the instant invention are exemplary. These curves are not related to any quantitative rigorous law expressing the kinetic behavior of the concentration of oxygen upon the durability of the tires; but are primarily intended to provide a clear concept of the phenomenon involved as regards the influence of oxygen concentration upon the oxidation state as well as the effective temperature differential such as would be expected to exist between two known climatic conditions or ambient temperaures. The interpretation and the representation of experimental data in the kinetic analysis that are made herein is usually an individual problem for each tire design and construction, therefore the particular construction as well as the particular set of test conditions; including speed, terrain conditions, moisture conditions, humidity, type of liner, and any other factor that may govern the heat build up and the absolute degree of oxidative degradation; must be considered in conjunction with curves presented herein. Accordingly, the curves of the instant invention simplify the correlation of data with respect to these pertinent variables and accordingly provide a guide in the treatment of kinetic problems so far as regards analysis of test results under other sets of conditions and for other tire construction.

It is well known that the law of mass action regarding the instantaneous velocity of chemical reaction is proportional to the concentration of the reactant at any moment. In order to simplify the complicated problems that may be associated with theoretical considerations of this nature, the treatment of the instant concepts is reduced to graphical representations based on actual test results to thereby enable the practice of this invention in a simplified manner. While this may not be an exact explanation for the chemical reaction occurring within the tire that may be attributed to the concentration of the oxygen component of the inflating agent, it is to be understood that it is within the comprehension of those skilled in the art to further define and to further reach more exacting answers in accordance with the various mathematical formula one wishes to associate with the instant problem. As a practical consideration, however, it is assumed that the reaction of the oxygen with the various elements of the tire is of a nature that allows a molecule of oxygen to react with a molecule of polymer. It is known that the reaction of the oxygen with the polymer is proportional to the concentration of the oxygen contained within the fill gas.

As stated before, heat build-up within the tire is sometimes drastically increased by overloading the tire whereupon the extreme flexing as well as the additional strains placed upon the tire component causes a greater heat build-up to occur within the tire, thus bringing about a premature failure of the tire. This method of producing premature failure is undesirable since the failure patterns brought into play are not the same as that which would otherwise occur had the tire been tested under conditions of normal load. On the other hand, where the true durabilility may be ascertained by causing premature failure of the tire, and where the premature failure occurs at a lower milage that is directly proportional to normal failure patterns, the cost of testing can be reduced in direct proportion to the reduction in miles required to produce this satisfactory destruction of the tire. This improved method of testing may be advantageously used indoors, outdoors, on test wheels, or on test vehicels or any other means that suitably represents commercial usage.

Oxygen inflation permits premature destruction of the tire through advanced oxidative degradation generated within the tire body due to the oxidation reaction in a manner similar to increasing the internal temperature or heat build-up of the tire as though the tire had been used in a hotter environment. This method of accelerated destruction imposes natural loads, stresses, and strains upon the tire and accordingly, the miles to failure in a controlled test conducted with an oxygen enriched inflation gas is in direct proportion to the concentration of the oxygen as well as to the number of miles that would have normally been driven had the tire been inflated with air, for example. Furthermore, two identical tires having identical dynamic stability properties, with one tire being inflated with substantially zero percent oxidant, and the second tire being inflated with 100% oxygen, may be driven to destruction. The tire having substantially zero percent oxygen as the inflation agent will exhibit extremely high durability while the second tire will fail at a number of miles or a life span that represents perhaps only one fourth the mileage required to bring about the failure of the first time. From this data representing the durability of two identical tires, it can be predicted with accuracy the effect that varying concentrations of oxygen used in the inflation agent will have upon the durability of similar tires. Therefore, since heat build-up is a major controlling factor in the durable life of a tire, and since the amount of oxidant contained in the inflation agent is a major factor in controlling the degree of oxidation in a running tire, it follows that the percent oxygen present in a tire may be used to control the durability of a tire under specific sets of test conditions.

Oxygen enrichment or dilution has no apparant effect upon the actual wear rate of a tire at low durability since the oxygen first attacks the body compounds thereby causing a more immediate and drastic action before the oxygen migrates into the tread compound where it then influences the rate of wear.

In testing tires, it is desirable to select various seasons of the year, or times of the day, for the testing of a tire so as to control the ambient temperature and accordingly control the rate of oxidation of the tire in order to obtain reproducible test results.

It is further desirable, in carrying out tests on pneumatic tires, to be able to simulate various ambient conditions such as may be repreesnted by the different seasons or climatic condtions that the tire may later encounter during actual use.

It is further desirable, in testing a tire, to be able to cause effective oxidation reaction rates that correspond to conditions of identical internal temperature levels or heat build-up in the various tires being tested, so as to enable accurate comprarison of data obtained in one test with the data obtained in a second test, although each of the tests may have been conducted at various parts of the year or at different geographical locations It is accordingly an object of this invention to provide a method of testing whereby the above desired test environments may be simulated at any time of the year.

Another object of this invention is to provide a method of tire testing wherein various seasons of the year may be simulated in a tire testing program.

Another object of this invention is to provide a rapid method of enabling the influence of a tube or liner associated with a tire to be evaluated.

Another object of this invention is to provide an accelerated method of measuring the oxidation resistance of tire body compounds.

Another object of this invention is to increase the safety factor of a tire by improving the durable properties through control of the percentage composition of oxidant of the inflating agent used to inflate the tire.

Another object of this invention is to provide a method of testing tires wherein the oxidation degradation of the tire material is directly controlled by selecting the composition of the gaseous inflating agent.

A still further object of this invention is to provide a method of tire testing wherein the inflation fluid used in conjunction with the tire contains varying amounts of oxygen together with an inert that may include either nitrogen, helium, carbon dioxide, or one of the rare gases so as to directly control the ultimate degree of oxidation in a predetermined manner.

Another object of this invention is to provide a method of tire testing wherein the inflating gas used to fill the pneumatic tire is comprised of an oxygen/helium or oxygen/nitrogen mixture wherein the oxygen is varied from zero to 100% in order to control the degree of oxidation that occurs within the tire.

Another object of this invention is to provide an accelerated method of measuring the oxidation resistance of tire cords and of the tire cord treatments.

Still another object of this invention is to provide a method that enables one to study specific types of tire imperfections as conveniently measured by radial and/or lateral force variations for their effect upon the oxidative deterioration occurring in specific or general areas of a tire's anatomy.

A primary object of this invention is to provide an accelerated test method wherein the miles required to cause destruction of the tire may be drastically reduced by employing varying amounts of oxidants as a component of the inflating agent, and wherein the results of the test are used to determine the normal durable properties of the tire.

The above objects are attained in accordance with the present invention by inflating a tire of the pneumatic type with a mixture of gases, including an inert and an oxidant, and controlling the ratio of the oxidant with respect to the inert so as to produce a predetermined oxidation reaction within the tire material and accordingly simulate the same degree of oxidation obtained with a lesser concentration of oxygen but at other ambient temperatures.

Figure 6:
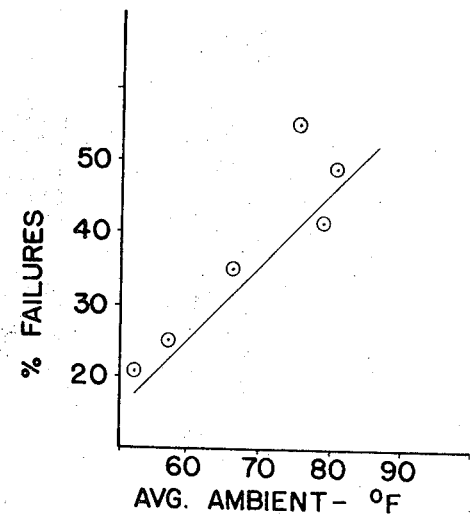
Figure 7:
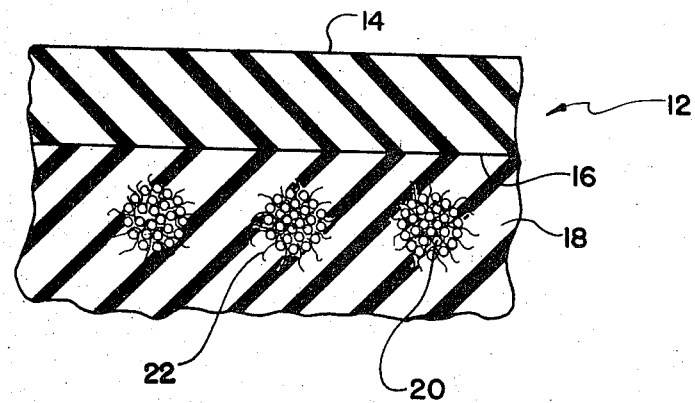

FIG. 6 is a curve illustrating the effect of the average ambient temperature upon the durability or failure patterns exhibited by like tires tested under identical service conditions, but at different seasons of the year; and FIG. 7 is a partial cross-sectional view of a pneumatic tire, with some parts broken away, and other parts being more or less schematically represented in order to best illustrate some of the teachings of this invention.

In FIG. 7, the arrow at numeral 12 generally indicates a partial cross-sectional view of a pneumatic tire that more or less diagrammatically illustrates the elements of a tire body. The numeral 14 generally illustrates the gas chamber side of a liner compound, and numeral 16 shows the interface between the liner and the tire body insulation compound 18. The tire cord 20 is provided with a cord surface treatment 22 which ties or bonds the individual fibers to each other as well as to the body insulation compound. The purpose of FIG. 7 is to define precisely the terms "elements of a tire" as used in this disclosure.

In carrying this invention into practice, and in order to illustrate several preferred embodiments thereof, the below illustrative examples utilize a gaseous mixture containing oxygen as the oxidant and nitrogen as the diluent, and wherein the oxygen content of the gaseous mixture is varied from 0.6% to 98%. It is to be understood, however, that other mixtures of oxidants and inerts may be substituted for the oxygen/nitrogen system, and still fall within the teachings of the present invention. For example, helium, carbon dioxide, and/or the rare gases may be used as the inert component of the gaseous system along with any oxidant that is normally in the gaseous phase under ordinary conditions of temperature and pressure.

Carbon dioxide, when used as the inert component of the inflating agent, performs satisfactorily since carbon dioxide is an inert as well as an excellent interceptor of heat, and hence will transfer heat more readily than air. Hence, in a tubeless tire, where part of the metal wheel is exposed, the carbon dioxide will absorb heat from the tire body and transfer the absorbed heat to the exposed metal part of the wheel more readily than either air or nitrogen, thus maintaining the tire carcass at a lower temperature.

The inert may alternatively be comprised of a mixture of carbon dioxide, nitrogen, and the rare gases such as obtained by the complete combustion of atmospheric air by burning air together with a suitable fuel in an inert generator. The details of an inert generator are known in the art, and such a generator will provide a substantially complete inert atmosphere that may be used as the inflating agent in carrying this invention into practice.

In carrying this invention into practice, as a matter of convenience, the pressure of the tires is reduced to a value whereupon the addition of either pure oxygen or nitrogen to the final desired inflation pressure will result in a mixture having substantially the correct desired proportion of oxidant and inert in the fill gases. For percentage concentrations outside the range provided by this expedient, purging is necessary to attain the correct gas mixture. While the percent composition of gases employed at the two extreme conditions of oxidation has been recorded herein as 98% oxygen or 0.6% oxygen, it must be understood that the zero percent oxidant and a 100% oxidant is also contemplated, although as a matter of practicality, these values ordinarily are not employed because of the difficulty of attaining absolute, or zero and 100%, oxidant atmospheres in tubeless tires. Tube type tires offer no difficulties attaining zero and 100% mixtures of oxidants since they may be completely exhausted prior to inflation.

The following tables set forth the percentage oxygen contained in the nitrogen/oxygen atmosphere of the fill gas used to inflate a pneumatic tire, with the remainder of the table illustrating the changes in durability and wear derived from controlling the oxygen content of the fill gas. The results of the test indicate that a fill gas having an oxygen enriched atmosphere accelerates the failure of tires as compared to an inert atmosphere. Hence, if tires are filled with increasing amounts of oxygen as the fill gas or inflating agent, the miles to failure will decrease in proportion to the concentration of the oxidant. It follows that as the percentage composition of oxygen contained in the inflating agent or fill gas of a tire increases, the miles to failure that the tire may be driven in a durability test decreases linearly. As this series of tests indicates, the presence of increasing amounts of oxygen brings about the effect of an increase in the heat build up of the tire without actually increasing the temperature and therefore simulates a climatic condition of increasing ambient temperatures as well as simulating higher running temperatures induced by more stringent test conditions. For example, a tire that is being evaluated in a test conducted during the winter months can be inflated with a gas containing a sufficient concentration of oxygen to cause the effect of increasing the heat build-up within the tire to be equal to the same results obtained in a durability test as though the test had been conducted during a summer test program rather than being conducted in cold winter weather. The comparable oxidation rate resulting from a higher temperature with normal air inflation of 21% oxygen, when duplicated by overloading the tire, brings about internal stresses and strains that are uncommon to ordinary driving conditions and accordingly the failure pattern of the overloaded tire is different from that expected from a normally loaded tire that is being driven under test conditions equal to actual commercial usage.

TABLE I.—MILEAGE FAILURE RECORD AND RELATIVE PERFORMANCE

Test conditions: 80 m.p.h.; 1,620 lb. load; 32 p.s.i. inflation; 8.25-14 tires

| | Miles to failure | | | | Relative durability performance to air | | | |
|---|---|---|---|---|---|---|---|---|
| | 0.6% $O_2$ | 21% $O_2$ | 50% $O_2$ | 98% $O_2$ | 0.6% | 21% | 50% | 98% |
| H | [1] 3,550 (12,000) | [1] 6,436 (9,400) | [1] 7,742 | [1] 4,370 | 54.9 (127.8) | 100.0 | 119.5 (82.3) | 67.5 (46.5) |
| E | [1] 15,500 | [1] 11,065 | [1] 7,355 | [1] 4,601 | 140.0 | 100.0 | 66.5 | 41.7 |
| H plus E, average | 13,750 | 10,233 | 7,549 | 4,490 | 134.2 | 100.0 | 73.7 | 43.9 |
| I | [2] 24,880 | [1] 21,157 | | [1] 8,175 | 117.7 | 100.0 | | 38.7 |
| A | [3] 17,000 | [1] 12,890 | | | 130.8+ | 100.0 | | |
| B | [2] 6,390 | [4] 5,510 | | | 115.9 | 100.0 | | |
| C | [1,5] 10,450 | [6] 13,550 | | | 77.1 | 100.0 | | |
| D | [1] 4,360 | [4] 5,425 | | | 80.5 | 100.0 | | |
| F | [7] 6,925 | [8] 2,400 (5,500 est.) | | | 288.5 (125.0) | 100.0 | | |
| G | [1,9] 18,195 | [5] 8,342 | | | 218.1 | 100.0 | | |
| Average miles | 11,856+,[10] 12,795 | 9,645,[10] 12,795 | | | 135.9+ [10] 126.0 [11] 125.7 | 100.0 100.0 100.0 | 102.5 [10] 79.4 | 49.3 42.3 |

[1] Separation.
[2] Bead separation.
[3] Discontinued test.
[4] Chunk-out.
[5] Ply separation.
[6] Tire failed due to cord breakage at bead blister.
[7] Band ply breakage.
[8] Ply separation in lower sidewall just above bead turn up.
[9] Tread cracks undercutting ribs.
[10] Using estimated values.
[11] Excluding road hazard failure.

TABLE II.—MILEAGE FAILURE RECORD AND RELATIVE PERFORMANCE

Test conditions: First 5,000 miles, 60 m.p.h.; 1,380 lb.; 24 p.s.i.; 8.25-14 tires
Second 5,000 miles, 70 m.p.h.; 1,500 lb.; 32 p.s.i.; 8.25-14 tires
After 10,000 miles, 80 m.p.h.; 1,620 lb.; 32 p.s.i.; 8.25-14 tires

| | Miles to failure | | | | Relative durability performance to air | | | |
|---|---|---|---|---|---|---|---|---|
| | 0.6% | 21% | 50% | 98% | 0.6% | 21% | 50% | 98% |
| H | [1] 17,325 [1] 16,250 | [1] 13,750 [1] 13,700 | [1] 10,300 [1] 10,880 | [1] 5,683 [1] 5,735 | | | | |
| Average | 16,788 | 13,725 | 10,590 | 5,735 | 122.1 | 100.0 | 77.0 | 41.7 |
| E | [1] 9,480 [3] 18,595 | [2] 11,090 [3] 10,870 | [1] 10,000 [1] 10,420 | [1] 8,625 [1] 6,000 | | | | |
| Average | 14,038 | 10,980 | 10,210 | 7,313 | 127.9 | 100.0 | 93.1 | 66.6 |
| H plus E, average | 15,413 | 12,353 | 10,400 | 6,524 | | | | |
| I | [4] 27,070 [4] 27,327 | [1] 22,500 [5] 25,895 | | | | | | |
| Average | 27,199 | 24,198 | | | 112.3 | 100.0 | | |
| A | [1] 13,750 [7] 19,210 | [6] 14,250 [1] 14,176 | | | | | | |
| Average | 16,480 | 14,213 | | | 115.9 | 100.0 | | |
| B | [8] 10,430 [10] 7,020 | [9] 11,773 [10] 12,190 | | | | | | |
| Average | 8,725 | 11,982 | | | 72.8 | 100.0 | | |
| C | [7] 3,600 [5] 19,491 [11] 24,500 | [1] 16,350 [8] 18,000 | | | | | | |
| Average | 21,996 | 17,175 | | | 128.0+ | 100.0 | | |
| D | [1] 14,670 [1] 13,100 | [9] 15,000 [9] 12,058 | | | | | | |
| Average | 13,885 | 13,529 | | | 102.5 | 100.0 | | |
| F | [1] 11,850 [10] 15,120 | [11] 15,000 [12] 2,500 | | | | | | |
| Average | 13,485 | 8,750 | | | 154.0 | 100.0 | | |

See footnotes at end of table.

TABLE II—Continued

|  | Miles to failure | | | | Relative durability performance to air | | | |
|---|---|---|---|---|---|---|---|---|
|  | 0.6% | 21% | 50% | 98% | 0.6% | 21% | 50% | 98% |
| G | [1] 17,690<br>[1,6] 18,795 | [1] 12,675<br>[1] 8,760 |  |  |  |  |  |  |
| Average | 18,243 | 10,718 |  |  | 170.0 | 100.0 |  |  |
| Average miles | [4] 16,750 | 13,919 |  |  | 122.8+ | 100.0 | 85.0 | 54.1 |

[1] Separation.
[2] Bead chafe.
[3] Blow out.
[4] Worn to fabric.
[5] Excluding road hazard failure.
[6] Ply separation.
[7] Cut—road hazard.
[8] Bead separation.
[9] Chunk-out.
[10] Band ply breakage.
[11] Discontinued test.
[12] Ply separation in lower sidewall just above bead turn up.

TABLE III

| | El Paso Texas, daily average | | | | | Detroit, Michigan, daily average | | | |
|---|---|---|---|---|---|---|---|---|---|
| | Maximum | Minimum | Average | $O_2$ composition to use for July-El Paso, Texas | | Maximum | Minimum | Average | $O_2$ composition convert to El Paso, July |
| January | 57 | 32 | 44½ | 76½ | January | 31 | 19 | 25 | [1] 100% |
| February | 62 | 37 | 49½ | 69 | February | 32 | 18 | 25 | [1] 100% |
| March | 69 | 42 | 55½ | 60 | March | 42 | 27 | 34½ | 91½ |
| April | 77 | 50 | 63½ | 48 | April | 55 | 37 | 46 | 74 |
| May | 86 | 58 | 72 | 35 | May | 67 | 48 | 57½ | 57 |
| June | 94 | 67 | 80½ | 22½ | June | 77 | 58 | 67½ | 42 |
| July | 93 | 70 | 81½ | [2] 21 | July | 82 | 63 | 72½ | 34½ |
| August | 91 | 68 | 79½ | 24 | August | 80 | 62 | 71 | 36 |
| September | 86 | 63 | 74½ | 31½ | September | 73 | 55 | 64 | 47 |
| October | 77 | 52 | 64½ | 46½ | October | 60 | 44 | 52 | 66 |
| November | 66 | 40 | 53 | 64 | November | 46 | 33 | 39½ | 84 |
| December | 57 | 33 | 45 | 76 | December | 35 | 24 | 29½ | 99 |
| Average | 76 | 51 | 63½ | | | | | | |

[1] 106% by calculation.
[2] Air.

TABLE IV.—INCREMENTAL TREAD DEPTH LOSS DATA

[Single tires; 2,500 mile increments,
80 m.p.h.; 1620 lb. load; 32 p.s.i. inflation test]

(Mils loss per 2,500 miles)

| | 1st 2,500 | | 2d 2,500 | | 3d 2,500 | | 4th 2,500 | | 5th 2,500 | | 6th 2,500 | |
|---|---|---|---|---|---|---|---|---|---|---|---|---|
| | 0.6 | 21.0 | 0.6 | 21.0 | 0.6 | 21.0 | 0.6 | 21.0 | 0.6 | 21.0 | 0.6 | 21.0 |
| A | 66.1 | 66.3 | 64.2 | 64.1 | 44.0 | 48.0 | 26.7 | 33.5 | 44.4 | 60.6 | | |
| B | 39.2 | 48.1 | 29.9 | 28.8 | | | | | | | | |
| C | 68.9 | 7.15 | 49.4 | 52.9 | 25.6 | 34.8 | 28.1 | 55.9 | 29.7 | | | |
| D | 53.5 | 45.9 | 35.2 | 31.5 | | | | | | | | |
| E | 48.7 | 46.6 | 45.7 | 46.1 | 28.6 | 33.6 | 30.2 | 44.7 | 41.5 | | 36.5 | |
| F | 58.7 | 50.1 | 37.6 | | | | | | | | | |
| G | 49.8 | 51.2 | 46.4 | 55.3 | 42.8 | 43.8 | 35.1 | | 31.6 | | | |
| H | 34.8 | 37.0 | | | 35.6 | | | | | | | |
| I | 41.5 | 42.3 | 24.3 | 25.6 | 20.9 | 20.9 | 25.2 | 28.2 | 42.1 | 47.1 | 45.0 | 46.8 |
| Average | 51.2+ | 51.0 | 42.1+ | 43.4+ | 32.4 | 36.2 | 27.5+ | 40.6 | 43.2+ | 53.8+ | | |

Relative wear performance of 0.6% oxygen content versus 21.0% oxygen content
(The higher the value the more improved the wear. Air is 100%)

| | 2,500 mile increments | | | | | | 5,000 mile increments | | |
|---|---|---|---|---|---|---|---|---|---|
| | 1st | 2d | 3d | 4th | 5th | 6th | 1st | 2d | 3d |
| A | 100.3 | 99.9 | 109.0 | 125.5 | 136.6 | | 100.1 | 115.2 | |
| B | 122.8 | 96.5 | | | | | 111.1 | | |
| C | 103.8 | 107.0 | 136.0 | 198.8 | | | 105.0 | 168.9 | |
| D | 85.9 | 89.5 | | | | | 87.2 | | |
| E | 95.7 | 100.9 | 117.5 | 148.0 | | | 98.2 | 133.0 | |
| F | 85.4 | | | | | | | | |
| G | 102.9 | 119.0 | 102.3 | | | | 110.9 | | |
| H | 106.3 | | | | | | | | |
| I | 102.0 | 105.3 | 100.0 | 112.9 | 111.8 | 104.0 | 103.1 | 106.5 | 107.7 |
| Average of all | 100.5+ | 102.6 | 113.0 | 146.3 | 124.2 | | 102.2 | 130.9 | 107.7 |
| Average of 2 | 101.1+ | 102.6 | 104.5 | 119.2 | 124.2 | | | | |
| Average of 4 | 100.4+ | 103.3 | 115.6 | 146.3 | | | 101.6 | 130.9 | |
| Average of 5 | 100.9+ | 106.4 | 113.0 | | | | | | |
| Average of 7 | 101.9 | 102.6 | | | | | | | |

TABLE V.—INCREMENTAL WEIGHT LOSS DATA

[Single tires, size 8.25-14; 2,500 mile increments]

(Grams loss per 2,500 miles)

|   | 1st 2,500 | | 2d 2,500 | | 3d 2,500 | | 4th 2,500 | | 5th 2,500 | | 6th 2,500 | |
|---|---|---|---|---|---|---|---|---|---|---|---|---|
|   | 0.6 | 21.0 | 0.6 | 21.0 | 0.6 | 21.0 | 0.6 | 21.0 | 0.6 | 21.0 | 0.6 | 21.0 |
| A | 335 | 300 | 380 | 365 | 330 | 465 | 340 | 445 | 355 | 470 | | |
| B | 200 | 310 | 205 | 190 | | | | | | | | |
| C | 430 | 475 | 310 | 320 | 180 | 200 | 230 | 435 | | | | |
| D | 190 | 205 | 210 | 260 | | | | | | | | |
| E | 225 | 210 | 335 | 380 | 280 | 270 | 300 | 410 | 330 | | 310 | |
| F | 260 | 242 | 305 | 305 | | | | | | | | |
| G | 320 | 445 | 390 | 355 | 290 | 290 | 370 | | 265 | | | |
| H | 140 | 190 | | | | | | | | | | |
| I | 230 | 210 | 220 | 220 | 170 | 190 | 230 | 260 | 330 | 375 | 405 | 455 |
| Average | 259 | 289+ | 294 | 299 | 250 | 283 | 275 | 387+ | 342+ | 422+ | 405 | 445 |

Relative wear of 0.6% oxygen inflation versus 21% oxygen inflation
(The higher the value the more improved the wear. Air=100%)

|   | 2,500 mile increments | | | | | | 5,000 mile increments | | |
|---|---|---|---|---|---|---|---|---|---|
|   | 1st | 2d | 3d | 4th | 5th | 6th | 1st | 2d | 3d |
| A | 89.5 | 96.0 | 141.0 | 130.9 | 132.2 | | 93.0 | 135.9 | |
| B | 155.0 | 92.5 | | | | | 123.3 | | |
| C | 110.4 | 103.1 | 111.0 | 189.0 | | | 107.4 | 155.0 | |
| D | 108.0 | 123.8 | | | | | 116.1 | | |
| E | 93.4 | 113.3 | 96.5 | 136.5 | | | 105.3 | 117.1 | |
| F | 93.0 | 100.0 | | | | | 96.9 | | |
| G | 139.0 | 91.0 | 100.0 | | | | 112.6 | | |
| H | 135.6 | | | | | | | | |
| I | 91.0 | 100.0 | 111.8 | 113.0 | 113.6 | 110.0 | 104.7 | 112.5 | 111.5 |
| Average of all | 112.8 | 102.4+ | 112.0+ | 142.3+ | 123.0 | 110.0 | 107.4 | 130.1 | 111.5 |
| Average of 2 | 90.4 | 98.0 | 126.4 | 122.0 | 123.0 | | | | |
| Average of 4 | 96.1 | 103.1 | 115.1 | 142.3 | | | 102.6 | 130.1 | |
| Average of 5 | 100.3 | 100.7 | 112.0 | | | | | | |
| Average of 8 | 109.9 | 102.4 | | | | | | | |

TABLE VI.—INCREMNTAL TREAD DEPTH LOSS DATA

[Average of 2 tires; 2,500 mile increments]
5,000 miles 60 m.p.h.; 1,380 lb. load; 24 p.s.i. inflation
After 5,000 miles 70 m.p.h.; 1,500 lb. load; 32 p.s.i. inflation
After 10,000 miles 80 m.p.h.; 1,620 lb. load; 32 p.s.i. inflation
(Tires run until failure or bald.)

[Mils loss per 2,500 miles]

|   | 1st 2,500 | | 2d 2,500 | | 3d 2,500 | | 4th 2,500 | | 5th 2,500 | | 6th 2,500 | |
|---|---|---|---|---|---|---|---|---|---|---|---|---|
|   | 0.6 | 21.0 | 0.6 | 21.0 | 0.6 | 21.0 | 0.6 | 21.0 | 0.6 | 21.0 | 0.6 | 21.0 |
| A | 57.8 | 57.9 | 20.1+ | 19.7+ | 37.5 | 34.4+ | 54.3 | 56.2 | 40.6 | 37.4+ | | |
| B | 41.3+ | 44.9+ | 26.3 | 25.8 | (26.3) | 26.9+ | (29.9) | 26.1 | | | | |
| C | 33.6+ | 31.0 | 28.4+ | 31.6 | 45.1+ | 44.4 | 35.1 | 36.7 | 47.5+ | 40.9+ | 27.6 | 21.7+ |
| D | 37.2+ | 37.0 | 28.6+ | 29.5 | 18.7 | 26.1 | 38.6 | 42.5+ | 23.6 | 26.6 | | |
| E | 45.7+ | 40.9+ | 47.8+ | 39.8+ | 53.2 | 58.7+ | 48.5+ | 47.1+ | | | | |
| F | 44.4+ | 47.1 | 27.4+ | 29.1 | 35.6 | 33.3 | 56.2 | 48.1+ | | | | |
| G | 43.1+ | 46.1 | 20.8 | 21.2 | 54.4+ | 50.2+ | 22.0 | 29.9+ | 46.9+ | | 45.8+ | |
| H | 45.1 | 45.1 | 27.4 | 28.1+ | 36.3 | 40.9+ | 48.5+ | 51.7+ | 41.1+ | 40.4+ | 23.6+ | |
| I | 41.6 | 38.1 | 21.6 | 33.0+ | 28.1+ | 29.6 | 21.7 | 24.0+ | 26.5 | 29.7 | 31.3+ | 26.8 |
| Average | 43.3+ | 43.1 | 27.6 | 28.7 | 37.2 | 38.3 | 39.4 | 40.3 | 35.9 | 35.0 | 29.5 | 24.3 |

Relative wear performance, 0.6% oxygen versus 21% oxygen content
(The higher the value the more improved the wear. Air=100%)

|   | 2,500 mile increments | | | | | | 5,000 mile increments | |
|---|---|---|---|---|---|---|---|---|
|   | 1st | 2d | 3d | 4th | 5th | 6th | 1st | 2d |
| A | 100.2 | 98.0 | 91.9 | 103.4 | 92.3 | | 99.5 | 98.7 |
| B | 108.6 | 98.0 | (102.4) | (87.3) | | | 104.5 | |
| C | 92.1 | 111.0 | 98.5 | 104.5 | 86.0 | 78.8 | 100.7 | 101.0 |
| D | 99.4 | 103.0 | 139.5 | 110.0 | 112.7 | | 100.9 | 119.7 |
| E | 89.5 | 83.3 | 110.4 | 97.2 | | | 86.3 | 104.0 |
| F | 106.0 | 106.0 | 93.5 | 85.5 | | | 106.0 | 88.8 |
| G | 107.0 | 102.0 | 92.5 | 136.0 | | | 105.0 | 105.0 |
| H | 100.0 | 102.7 | 112.9 | 106.7 | 98.1 | | 101.0 | 109.1 |
| I | 91.5 | 153.0 | 105.1 | 110.3 | 112.0 | | 112.5 | 107.6 |
| Average of all | 99.3+ | 106.3 | 105.5 | 106.7 | 100.2 | | 101.8 | 104.2+ |
| Average of 8 | | | | | | | 101.5 | 104.2 |
| Average of 5 | 96.6 | 113.5 | 109.5 | 103.0 | 100.2 | | | |

NOTE.—Figures in parenthesis represent one tire only.

TABLE VII.—INCREMENTAL WEIGHT LOSS DATA

[Average of 2 tires, 2,500 mile increments]
5,000 miles 60 m.p.h.; 1,380 lb. load; 24 p.s.i. inflation
After 5,000 miles 70 m.p.h.; 1,500 lb. load; 32 p.s.i. inflation
After 10,000 miles 80 m.p.h.; 1,620 lb. load; 32 p.s.i. inflation
(Tires run until failure or bald.)

[Grams loss per 2,500 miles run]

|   | 1st 2,500 | | 2d 2,500 | | 3d 2,500 | | 4th 2,500 | | 5th 2,500 | | 6th 2,500 | |
|---|---|---|---|---|---|---|---|---|---|---|---|---|
|   | 0.6 | 21.0 | 0.6 | 21.0 | 0.6 | 21.0 | 0.6 | 21.0 | 0.6 | 21.0 | 0.6 | 21.0 |
| A | 242 | 320 | 210 | 175 | 307+ | 365 | 333 | 350 | 300 | 345 | | |
| B | 189 | 220 | 170 | 160 | 207 | 190 | 210 | 153 | | | | |
| C | 252 | 239 | 260 | 245 | 345 | 325 | 218 | 230 | 263 | 255 | 198 | 255 |
| D | 240 | 235 | 180 | 202+ | 258 | 198 | 175 | 223 | 248 | 230 | | |
| E | 280 | 245 | 305 | 368 | 314 | 340 | 373 | 268 | | | | |
| F | 190 | 220 | 245 | 225 | 225 | 275 | 224 | 238 | 328 | 303 | | |
| G | 168 | 183 | 243 | 293 | 283 | 278 | 245 | 345 | 253 | 290 | 340 | |
| H | 208 | 263 | 240 | 170 | 348 | 425 | 495 | 460 | 310 | 328 | | |
| I | 215 | 223 | 200 | 225 | 215 | 235 | 220 | 273 | 330 | 368 | 200 | 215 |
| Average | 220 | 229 | 239 | 229 | 278 | 292 | 277 | 282 | 290 | 303 | 199 | 235 |

Relative wear performance of 0.6% oxygen inflation versus 21.0% oxygen content
(The higher the value the more improved the wear. Air=100%)

|   | 2,500 mile increments | | | | | | 5,000 mile increments | | |
|---|---|---|---|---|---|---|---|---|---|
|   | 1st | 2d | 3d | 4th | 5th | 6th | 1st | 2d | 3d |
| A | 95.0 | 83.4 | 118.5 | 105.0 | 115.0 | | 89.5 | 111.6 | |
| B | 116.4 | 94.0 | 91.7 | 72.9 | | | 105.9 | 82.2 | |
| C | 94.8 | 94.2 | 94.2 | 105.5 | 97.0 | 129.0 | 94.5 | 98.5 | 110.5 |
| D | 98.0 | 112.5 | 76.9 | 127.0 | 92.8 | | 104.0 | 97.3 | |
| E | 87.5 | 102.6 | 108.1 | 71.8 | | | 104.6 | 88.5 | |
| F | 115.7 | 91.9 | 122.0 | 106.2 | 92.4 | | 102.2 | 114.2 | |
| G | 109.0 | 120.5 | 98.2 | 140.9 | 114.2 | | 115.9 | 118.0 | |
| H | 126.3 | 70.8 | 122.0 | 92.7 | 105.7 | | 96.6 | 105.0 | |
| I | 103.6 | 112.4 | 109.2 | 124.0 | 111.5 | 107.5 | 107.9 | 116.7 | 110.0 |
| Average of all | 105.1+ | 100.0 | 104.5 | 105.1 | 104.1 | 118.2 | 102.3+ | 102.3+ | 110.2 |
| Average of 2 | 99.7 | 103.3 | 101.7 | 114.8 | 118.0 | 118.2 | | | |
| Average of 7 | 105.6 | 98.0 | 100.1 | 114.5 | 104.1 | | | | |

TABLE VIII.—DURABILITY AND WEAR DATA

| Brand | Tire | Mils loss in 7,500 miles | Miles to failure | Failure |
|---|---|---|---|---|
| A | 1 | 178.4 | 12,890 | Separation. |
|   | 2 | 174.3 | 17,000 | Test discontinued. |
| B | 1 | 76.9 | 5,510 | Chunk out. |
|   | 2 | 69.1 | 6,390 | Bead separation. |
| C | 1 | ¹124.4 | 13,550 | Band ply breaking. |
|   | 2 | ¹118.3 | 10,450 | Separation.² |
| D | 1 | 77.4 | 5,425 | Chunk out. |
|   | 2 | ³79.6 | 4,360 | Separations. |
| E | 1 | 126.3 | 11,065 | Separation. |
|   | 2 | 123.0 | 15,500 | Separation. |
| F | 1 | ⁴48.1 | 2,400 | Bead separation |
|   | 2 | 96.3 | 6,925 | Band ply breakage. |
| G | 1 | 150.3 | 8,342 | Ply separation. |
|   | 2 | 139.0 | 18,195 | Chunk out separations due to cracking. |
| H | 1 | 75.5 | 6,463 | Separation. |
|   | 2 | ⁵33.7 | 3,550 | Separation. |
| I | 1 | 88.8 | 21,157 | Separation. |
|   | 2 | 86.7 | 24,880 | Bead separation. |
|   | 3 | 116.0 | 8,175 | Tire destroyed in failing. |

¹ Loss in 5,000 miles.
² Separation induced by one band ply cord cutting or chafing through liner compound permitting inflating gas to enter cord body with subsequent early separation developing aggravated by the high internal pressure of the tire.
³ at 4,360 miles.
⁴ Failure at 2,400 miles. Wear markedly biased by positioning, cure gradient, and climatological effects.
⁵ Wear loss biased by position, cure gradient and climatological effects Table I is a tabulation of the test results carried out in conjunction with twenty-three tires, not counting the emergency or spare tires provided for the experiment. Nine groups of tires constituted the experiment. Each of the nine groups of tires were fabricated by eight different manufacturers. As seen in Table I, three groups of tires were inflated with varying percentage oxygen contained in the inflating agent with the oxygen being varied from 0.6% to 98% while six groups of tires were inflated with gaseous mixtures containing 21% oxygen (air) and 0.6% oxygen. The performance test was conducted on a conventional vehicle at 80 miles per hour with each tire carrying a load of 1620 pounds at an inflation pressure of 32 p.s.i.g. The tires, size 8.25–14, were driven to destruction in order to ascertain their durability. As noted in the tabulations, some of the tires exhibited exceptionally high durability as exemplified by tires that were worn out to the fabric, while other tires exhibited extremely low durability as exemplified by tires that met an early destruction because of internal or structural defects such as the occurrence of ply separations, tread separations, and the like.

Looking at Table I, the relative performance using 21% oxygen (air) as an index of 100 indicates conclusively that the durable properties of a tire are directly related to the oxygen content of the inflating agent, and that an improvement in performance of as much as four-fold may be derived by varying the percentage composition of oxygen from 98% to 0.6%. It is also evident that whether one works with average mileage values or relative performance values, that the 0.6% oxygen content improves durability approximately 25% over air containing 21% oxygen.

Table II is similar to Table I except that the performance was conducted under substantially less severe conditions of speed and load. These items are amply noted in Table II.

In each of the above tables, certain inconsistencies in the results have been corrected as noted by the bracketed numerals. Regardless of whether the results are accepted as adjusted or as actually measured, the overall results are substantially the same. The above FIGS. 1 through 4 are based on the tabulated data of Tables I, II, and III for the most part. It should be noted that the tests of each tire in a group of tires were conducted under the same conditions of load, speed, and inflation. The durability test data, despite the one low mileage failure of a low oxygen content tire, show conclusively that the durability of the tires increases as the oxygen content of the tires is decreased. The cause of failure of the various tires are noted in the footnotes. The oxygen enriched tires generally failed due to separations developing between the tread and the tire body plies, and also due to separations between the plies.

Figure 1:
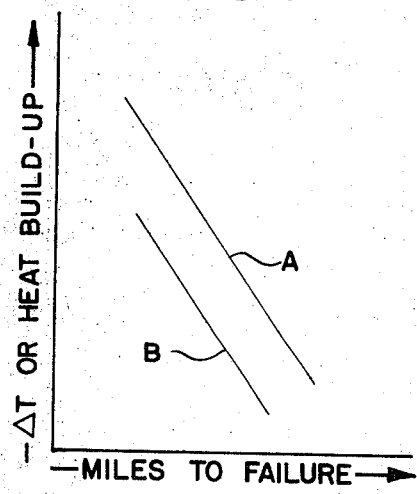
FIG. 1 is an idealized set of curves illustrating the effect of internal tire temperature on the durability of a tire.

Looking now to the details of FIG. 1, there is seen illustrated therein a pair of curves illustrating the broad principle that as the heat build-up within a tire increases, the miles to failure decreases. Hence, the durability of a tire is inversely proportional to the heat build-up within the tire body. It is elementary that a long durable life is highly desirable in any tire under normal circumstances. However, for the purpose of testing tires and in order to ascertain their durability property, it is desirable and highly economical to cause failure of the tires to occur in as few test miles as possible, so long as this failure pattern is reproducible and predictable and correlates with what happens in actual commercial usage.

Curve A of FIG. 1 shows the durability of a specific tire before the tire has aged; that is, a recently manufactured tire. Curve A indicates that as the internal temperature of heat build-up increases, the miles to failure, or durability, decreases.

Curve B of FIG. 1 shows the durability of a specific tire that has been subjected to aging; that is, the tire has been mounted on a vehicle and in the inflated condition for a considerable length of time where it has been subjected to the deleterious effect of the oxygen contained within the inflating agent as well as sunlight and moisture. Accordingly, the tire of curve B, although at one time identical to the tire of curve A, will fail prematurely as compared to the tire A in a durability test. Hence the tire of curve B has been subjected to long time aging which resembles a continuing vulcanization which in turn causes the state of cure to change to a less desirable value as compared to the state of cure of the tire of curve A. Had both tires been tested simultaneously while new, the curves A and B would be superimposed on one another, assuming each tire to have identical dynamic stability properties. As further noted in FIG. 1, the durability curves A and B parallel each other, indicating that the oxygen progressed through the liner compound at essentially the same relative rate. Hence the slope of the curves indicate the permeability of the liner. Since a liner compound governs the rate at which the inflating agent migrates into the tire body, it follows that the liner compound should be as impervious to the flow of gases as possible. Since an absolutely impervious liner is not known, an oxygen scavenger may advantageously be incorporated into the liner compound to thereby intercept the oxygen to prevent its migration into the tire body.

Figure 2:
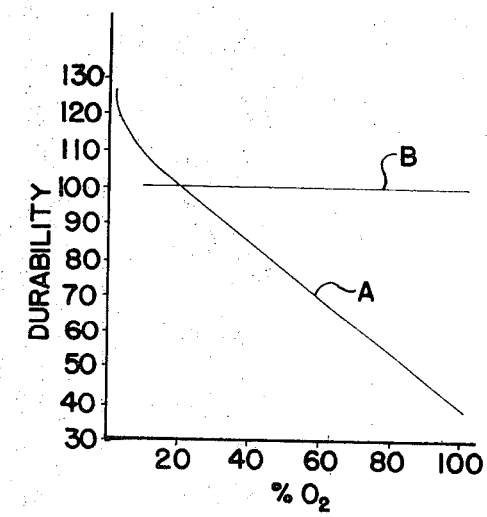
FIG. 2 illustrates a curve showing the effect of the percentage oxidant contained in the inflation gas of a pneumatic tire upon the durability of a tire, with air being considered the standard of 100%.

Curves A and B of FIG. 2 represent two tire constructions that differ only in the construction of the liner. The tire construction of curve A is provided with a normal liner as compared to the tire construction of curve B which is provided with an idealized impermeable membrane; hence, the migration of oxygen from the inflation gas into the tire body readily occurs in the more permeable liner of curve A as compared to the idealized or hypothetical non-permeable liner of curve B. Accordingly, the true durability of tire construction B compared to construction A must include allowances for the action of the liner, otherwise the results will be masked by including the properties of the liner in addition to the properties of the ply construction. Therefore, different curves must be established for each different tire construction to obtain a true comparison of the durability of tires. As stated above, the liner of curve B is idealized to illustrate an absolutely impermeable liner, however, such a liner is not found in actual practice and in actuality is probably not attainable. In actual practice, the liner compounds of a specific manufacturer are substantially identical. The major differences in liner compounds occurs between different manufacturers, and as stated above, the slope of curve A is a measure of the efficiency or the permeability of the liner.

Figure 3:
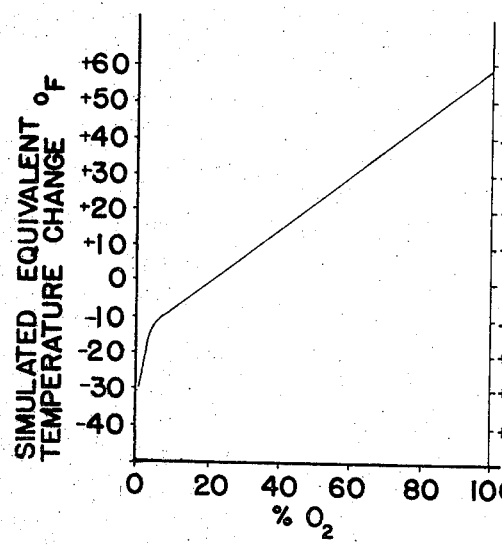
FIG. 3 is a plot of change in durability and simulated equivalent temperature differential versus the oxygen component of the inflating gas.

As noted in FIGS. 2 and 3, the curve appears to be a straight line function with the exception of the end of the curve depicting the low percentage composition of oxygen contained in the inflating agent. The hook on the curves at this percentage composition; that is, the departure from a straight line function; becomes extremely pronounced for percentage compositions of oxygen below 5%. While several factors may contribute to the presence of this "hook," the major cause is simply that the tires containing the low percentage oxidant have not undergone sufficient oxidation to fail. A further reason is that in a test of this type, the more nearly uniform tires survive while the non-uniform tires fail because of their non-uniformity features, thus leaving only the natural survivors that are uniform and accordingly run at lower temperatures and develop no local hot spots. In the absence of oxygen to feed the oxidation reaction, the more uniform tires have the opportunity to run until the tread has completely worn away.

Curve A of FIG. 2 was established from tabulations of data based on the actual test results of Tables I and II. In curve A, the percent oxygen contained within the inflation agent of tires is plotted against the durability of the tire measured as percent of miles to failure with 21% oxygen content (air) being equivalent to 100%. The results of curve A of FIG. 2 is reproducible, therefore should it be desired to ascertain the durability of a tire having the same design or construction of the tires represented by the curve A of FIG. 2, it would be unnecessary to test the new tire 21,000 miles as would be heretofore required when using air containing 21% oxygen as the inflation agent, but instead, the new tire can be inflated with 100% oxygen whereupon the new tire will normally fail at approximately 8,000–9,000 miles if driven under the same test conditions that were used to establish the curve of FIG. 2. The curve A of FIG. 2 therefore establishes the durability characteristics of a tire in a manner to provide a dictionary of stored terms that in turn permits further testing to be carried out using oxygen inflation techniques to thereby establish true durability properties for a tire under drastically reduced tire mileage.

Ambient temperatures have a marked influence upon tire durability. A study of several tire tests conducted on the same basic type tire over an interval of four years indicate that the incidence of tire failures increasingly progresses from a minimum value during the cold winter months and proceeds to a maximum value during the hottest summer months. Hence, from season to season, as the average ambient temperature conditions change, the incidence of tire failures also change. This is shown in the tabulation below.

TIRE ROAD TEST DURABILITY RECORDS
[Original Equipment—2 ply, 4 ply rating; and 4 ply nylon]

| Period | Average temp., °F. | No. of tires | No. of failures | Percent failed |
|---|---|---|---|---|
| Oct. 6–Dec. 6, 1961 (7.50–14) | 57 | 36 | 9 | 25 |
| June 1–July 14, 1962 (7.50–14) | 81 | 44 | 21 | 48 |
| Nov. 1–Nov. 29, 1962 (7.00–14) | 53 | 30 | 8 | 26.7 |
| July 26–Sept. 10, 1963 (7.50–14) | 78 | 43 | 18 | 42 |
| Apr. 12–May 8, 1964 (7.00–14) | 66 | 44 | 16 | 36 |
| Apr. 21–June 10, 1965 (new shape) (7.75–14) | 73 | 39 | 26 | 55 |

This data is also plotted in FIG. 6 and shows that the tire failure incidence occurs as a straight line function of the average ambient temperature existing during the period of the individual tests. The results of FIG. 6 and the tabulation above together show that a change of 1° F. ambient temperature is equivalent to or brings about a 1% change in tire durability. The first five tests as listed in the above table were run on tires having a shape factor of .82 (ratio of section height to section width). The last test listed was conducted on a newly developed and basically different tire having a shape factor of approximately 0.72. The higher incidence of failures in this test is partially due to the fact that the tire was newly developed by industry and accordingly the quality problems arising whenever a new product is developed had not yet been corrected.

As further noted in FIG. 3, the percent oxidant contained within the inflating agent of a tire may be chosen in a manner that enables the ambient temperature conditions of a proposed test to be modified towards either a hotter or cooler environment, and accordingly, tests carried out in this manner will duplicate test conditions at a different and specifically established climatic condition.

The slope of the line of FIG. 3 shows that a change of 1½% oxygen content in the fill gas is equivalent to a 1° F. change in its effect upon tire durability. It therefore follows that 1° F.=1½% oxygen=1% durability. This general theory is supported specifically by Tables I and II and FIG. 6, as well as the remaining tables of this application. Hence enrichment or dilution of an inflating agent with oxygen will bring about the equivalent of a 1° F. change, or a 1% change in durability, for each 1½% change in oxygen composition.

For example, in the winter months, should it be desirable to test a tire under conditions of usage approaching that of a desert climate, the composition of the fill gas is selected in accordance with the teachings of FIG. 3 and Table II. Conversely, when testing tires during the summer months, should a climatic condition approaching that of winter time test conditions be deemed desirable, the amount of oxidant contained within the fill gas is lowered an amount generally indicated by the data of FIG. 3.

As seen in FIG. 3, the calculated simulated ambient temperature differential versus percent oxygen contained within the inflation gas of a pneumatic tire is arranged in the form of a curve. Looking at the ordinate of the graph of FIG. 3, there is seen a zero $\Delta T$ representing 21% oxygen or ordinary air. Hence under any set of driving conditions, the ambient temperature at the test site or test area is assumed to be zero as the standard, regardless of the actual numerical value of the temperature. Accordingly, to ascertain the effect of a zero temperature differential upon an air inflated tire, 21% oxygen would be selected as the fill gas, since this percent oxygen is the standard inflation agent. Supposing, however, that it is desired to carry out a series of tests on tires at a temperature other than that of the environmental conditions of the testing area, as for example, in a region having colder climatic conditions. Should it be ascertained that the climatic conditions under which it is deemed desirable to carry out the test were an average of 25° colder than the ambient test conditions, this would represent a temperature differential or $\Delta T$ of $-25°$ and accordingly, the inflation agent of the tires to be tested would be adjusted to provide a composition of 1% oxygen to thereby lower the oxidation state of the tire to the identical heat build-up or internal temperature level of a tire having air as its inflation agent at an ambient temperature of 25° lower than that of the area where the actual test is to be conducted on the tire. The oxidative degradation caused by a percentage composition of 1% oxygen is therefore equivalent to the oxidative degradation brought about by a percentage composition of 21% oxygen at 25° F. cooler ambient condition; that is, the rate of destruction of the two conditions are equivalent. The results of the durable test carried out in this manner will be identical to results expected had the test been conducted in the colder climate using air as the inflation agent.

Conversely, where it is desired to determine the durability of a tire at a temperature substantially higher than that of the ambient temperature of the actual test, the average temperature of the hotter climate is ascertained, and assuming it to be 25° above that of the actual test area, FIG. 3 illustrates that an inflation composition including 58% oxidant must be selected to synthesize a climatic condition having a $\Delta T$ of 25° above the actual ambient test conditions.

As a further example of the utility of FIGS. 2 and 3, a curve that has been constructed from data based on a series of selected or screened tires, having an inflating agent containing varying percentage composition of oxidant therein, and tested under identical conditions of severity, will characterize the durability of that specific tire construction. This data may be stored in the form of a curve such as exemplified by FIG. 2 and future tires of similar construction can be rapidly evaluated for durability by inflating the tires with substantially pure oxygen, determining their durability properties, and correcting the results in accordance with the derived curve to determine the durability at any other percentage composition of oxygen, as for example, air at 21% oxidant. Furthermore, the durability at other climatic conditions may be established from the data of this curve by merely additionally determining the exact relationship between percentage oxidant and the effective internal temperature differentials in the form of oxidation state brought about by the presence of the oxidant.

Figure 4:
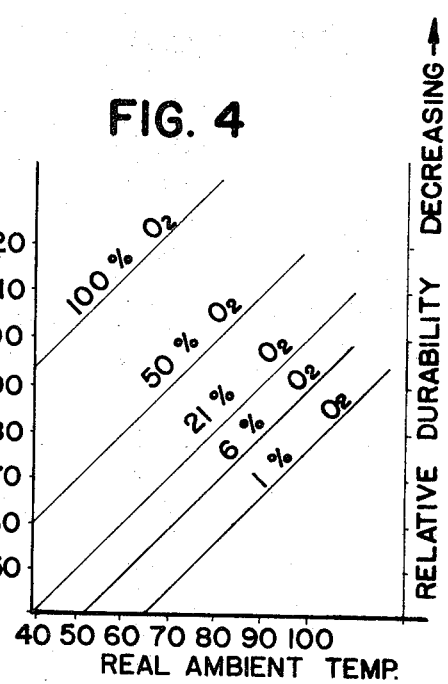
FIG. 4 is a series of curves illustrating the effect of the percentage oxygen contained in the inflating gas upon the durability and simulated ambient temperature of a different geographical location or different season of the year.

FIG. 4 illustrates a series of curves that permit selection of the percentage composition of oxidant required in the inflation gas in order to enable determination of the durability of a tire under climatic conditions that differ in temperature by the indicated amount.

Hence it may be seen that the instant invention offers a tremendous advance in methods of testing tires inasmuch as the actual road testing can be reduced to less than one-half that amount ordinarily required to obtain the same results when ordinary air is used (21% oxygen content). Furthermore, the instant method of being able to provide or to simulate any reasonable climatic condition is invaluable for the reason that a single testing area, when using the teachings of this invention, can carry out and duplicate tests as though they were being conducted in geographical regions far removed from the actual test site.

In my copending patent application Ser. No. 578,707 the relationship between tire non-uniformity and relative state of wear is shown, as well as the relationship between tire non-uniformity and durability. Since both relative wear and durability are governed by tire non-uniformity, it follows that within tires of the same family, individual tires having the greatest non-uniformity will wear faster and fail at lower mileages than more uniform tires that wear more slowly and fail at higher mileages. This is shown in Table VIII. It will be noted that three of the tires failed evidently because of gross structural deficiencies (tires F1, H2, and I3) while a fourth tire failed due to a minor structural deficiency (tire C2). It is specifically pointed out that the wear data are taken from a test conducted specifically to generate good wear comparisons and before the influence of oxidative degradation became appreciable in the undertread of the tire. As noted in the table, the tires that failed in the lowest number of miles consistently exhibited a higher wear rate. A higher wear rate for tires within a given family generally indicates a greater degree of imperfectness. A tire having a high degree of imperfectness will exhibit a low durability. Hence Table VIII illustrates that the more imperfect tires have higher wear rates and lower durability.

Figure 5:
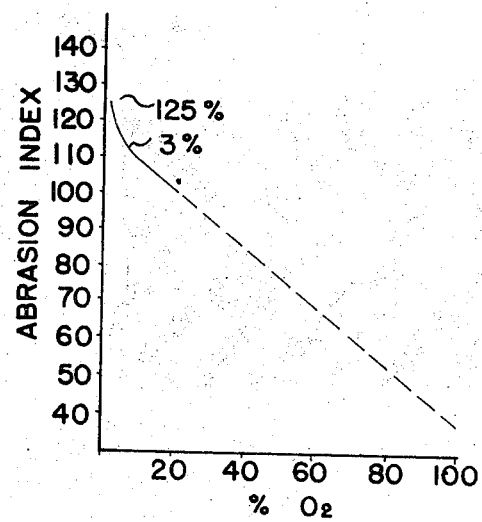
FIG. 5 is a curve illustrating the effect of the percentage oxygen contained in the inflating gas upon the relative wear rate of the tread stock.

In FIG. 5, the curve is extrapolated for relative rates of wear where the percentage composition of oxygen contained in the inflating agent exceeds 21%. This extrapolation is necessary for the tires having increased percentage oxygen always tend to fail early during a test due to the accelerated oxidative deterioration of the tire elements, and hence exhibit low durability. Accordingly, the rate of wear cannot be determined except for low percentage composition oxygen inflated tires, because only low percentage oxygen inflated tires survive so as to run a distance sufficient to develop wear data. A more perfect tire that is inflated with higher concentrations of oxygen will survive the test until the tread has been abraded away to expose the tread rubber compound that has undergone oxidative degradation. Therefore the wear rate is postulated to follow the extrapolated data of FIG. 5. Data from this type test will follow the indicated curve for percent composition oxygen below 21% since these tires will survive the oxidative degradation a distance sufficient to develop wear data, hence the lower percentage oxygen portion of the curve of FIG. 5 is similar to FIG. 2.

The effect of oxidative deterioration upon the durability of a tire, as shown in Tables I and II, is forcibly reaffirmed by the wear property of the tread compound which is a totally different criterion of measurement. As stated previously, the air chamber of a tire, in addition to containing the inflating gases, also unwittingly serves as the reservoir for the heat generated as the tire performs its work. This heat influence works outwardly from the tire interior to the exterior. If the tire body compounds are sufficiently strong to withstand this oxidative degradation, the tire elements will not physically fail, and the oxygen will then migrate into the tread rubber whereupon the tread rubber undergoes oxidative degradation. Obviously this deterioration is most pronounced in the under or lower portion of the tread in contrast to the upper or outside portion of the tread which wears away first. In order to illustrate the effect of oxidative deterioration upon the wear property in its most advanced form, it is necessary to conduct a severe test wherein the heat level of the tire is high and the rate of wear is sufficiently fast to permit wear comparisons to be made in the under portion of the tread and before the tire fails. The test condition that best meets this requirement is the test condition used for determining the durability data reported in Table I, namely 80 m.p.h., 1620 pound load, and 32 p.s.i. inflation. The comparative wear data developed are reported in Tables IV and V. The data of Table IV shows the tread loss measured by depth gauges as a function of the oxygen content of the inflating gas and are reported in incremental losses for each 25,000 miles. At these points of measurement, the bias effect of position of the tires upon the test vehicle have been essentially eliminated. The data conclusively shows the progressive increased degradation of the 21% oxygen inflated tires in comparison to the 0.6% oxygen inflated tires. In the initial stages of the test, the relative wear effect is hidden as affirmed by the data. As the tread is progressively worn away, the effect of oxidative deterioration upon the tread rubber becomes progressively more severe and after 7500 miles, where approximately 40% of the tread has been worn away, the deterioration effect becomes quite pronounced. It will be noted that Brand C tires inflated with 21% oxygen wore almost twice as fast as similar tires inflated with 0.6% oxygen during the fourth increment of wear. The deterioration in wear as a consequence of oxidative degradation of the tread compound is also shown by the data of Table V wherein the wear criterion is based on weight loss measurments of the tire.

In accordance with the teachings of this invention, the unusual durability and wear performance of Brand I tires are readily explainable. If it is assumed that the liner compound is of normal permeability to thereby allow a normal migration or flow of gases therethrough, the rubber insulation compounds surrounding the individual tire cords undergoes normal oxidative degradation causing the normal anticipated failure pattern. However, when applying this explanation, the lesser deterioration of the tread rubber must be attributed to the use of superior oxygen scavengers therein; but, this explanation lacks plausibility. More probably, the liner compound is a greatly improved type which materially inhibits the flow of gases therethrough to thereby reduce the ultimate oxidative degradation, as substantiated by the very small loss in relative abrasion resistance. When this explanation is considered, the ultimate cause of the 98% oxygen content inflated tire failing at 8175 miles is attributed to the gross non-uniformity of the tire itself. This non-uniformity of the tire is proven by the fact that it wore more than 30% faster than the remaining two identical tires that were tested under the same conditions (Table VIII). Accordingly, while the failure pattern of the 98% oxygen content tire exhibited normal oxidative degradation occurring within the tire body, the wear data did not indicate a corresponding degradation, and accordingly, its failure, while occurring at the anticipated mileage due to expected oxidation, occurred quite by accident at this anticipated mileage. The failure in fact was due to an entirely different reason, namely the gross non-uniformity of the tire as exemplified by the more rapid wear rate. The liner compound, if plotted as illustrated in FIG. 2, would assume a position between A and B.

Turning now to less severe test conditions and the influence of oxidative deterioration, the data of Tables VI and VII are presented. The test conditions herein employed are much less severe than in the previous test with lower loads and lower speeds being employed for the first 10,000 miles. During this first 10,000 miles, the influence of oxidative degradation proceeds at a very slow rate because of the lower operating temperatures of the tires. The wear rate is accordingly quite slow. Consequently, at 10,000 miles only 40% of the tread design has been worn away, and at this point when the influence of oxidative deterioration would begin to be detectable for the actual wear data, the tire body compounds had undergone severe oxidative deterioration and the tires failed before the oxidative influence upon the wear properly could be determined with precision. The incremental loss data (non-skid depth and weight losses of Tables VI and VII) indicate a slight deterioration in wear of the 21% oxygen inflated tire due to oxidative degradation. This order of magnitude of debasement would normally be expected from wear comparisons based on tread losses near the upper center portion of a cross-section of the tread.

As pointed out in my copending patent application Ser. No. 578,707, a perfect tire exhibits zero radial and lateral force variations as well as exhibiting an idealized cure gradient. This idealized or hypothetical tire will exhibit a maximum potential life or a maximum potential durability. Any factor whatsoever adversely affecting these parameters will detract a specific amount from the potential durability and wear of the tire. For example, the introduction of varying degrees of lateral or radial force variations will lower this potential durability as well as the wear resistance. Furthermore, improper bonding between adjacent plies, improper chemical composition anywhere within the tire carcass, or improper splices will detract a measurable amount from this idealized durability. Therefore it should be evident to those skilled in the art that tire durability evaluation must involve a consideration of all of these factors, for the tire durability can only be determined with exactness by first determining the magnitude of the departure from an idealized tire by measuring these imperfections and compensating for their presence so as to establish the true or idealized durability of the tire. Stated differently, the presence of varying degrees of imperfections will mask or obscure the results obtained in a durability and/or wear test, and if the presence of these factors are not considered, the true durability and/or wear potential of the tire cannot be determined with exactness since every tire will differ a measurable amount in perfectness from one tire to another and in accordance with the degree of the imperfections therein.

As pointed out in my copending patent application Ser. No. 504,727, now Pat. No. 3,397,583, a tire can be provided with a plurality of different tread compounds ranging from two to ten, with the compounds being placed adjacent each other upon a single carcass so as to form a continuous tread about the tire.

Since radial and lateral force variations influence tire wear, the magnitude of this force variation can be determined for each tread arc with the result being considered as a sub-function of the whole force variation within the 360° circumference of a predetermined number of whole tires. The varying rates of wear around the 360° circumference of the whole tires are ascertained by subjecting the multi-tread tire to a controlled wear test with the rates of wear being measured in light of the previously determined force variations to thereby ascertain the wear susceptibility of each of the tread arcs of the predetermined number of whole tires. Stated differently, each segment of the multi-tread tire will exhibit a wear rate proportional to its dynamic flexibility as well as the abrasion resistance of the tread compound, just as will a tread arc of a whole tread tire should the tread arc be measured for its force variations and subjected to a wear test. Accordingly, measurement of force variations in a tread arc of a whole tire and comparison of this result to the previously determined effect of force variation upon wear rate enables non-destructive determination of tread losses in a tread arc for its true wear properties rather than the wear properties due to the dynamic flexibilities of the individual tread arc.

Accordingly, in carrying my invention into practice, it is necessary to adjust the data obtained from the durability tests in light of the oxygen content, the ambient temperature, the dynamic stability or imperfectness of the tire, the cure gradient, as well as considering the influence of the liner or the presence of an inner tube.

Obviously, other factors must be considered in carrying out test programs of this nature. For example, a certain additive in the tire compound may act as a catalyst, and thus cause the oxidation reaction rate to exceed a value ordinarily expected from a specific concentration of oxidant. Conversely, there may be anticatalysts present that may retard the rate of oxidation that ordinarily would be brought about by the specific concentration of oxidants contained within the fill gas. Regardless of the presence of these influencing factors, a test that is conducted in accordance with the above teachings wherein the tires contain varying proportionate amounts of the oxidant so as to permit extrapolation back to 21% oxidant, or common air, will include these considerations. Hence a multitude of complicating factors may expeditiousy be solved or eliminated by establishing the profile of the effect of percent composition oxidant upon the durable properties of a particular tire construction.

Although my invention has been disclosed by way of the above several examples and explanations, it must be understood that the teachings contained herein will enable others skilled in the art to modify and apply these principles in other modes and under other circumstances while still remaining within the scope of the concepts set forth above. Therefore, what I claim and desire to be protected by U.S. Letters Patent should be considered primarily in light of the appended claims.

I claim:

1. A method of testing a pneumatic tire comprising the steps of:
   (1) preparing an inflating agent comprised of a mixture of gases including a known amount of an oxidant;
   (2) inflating the tire with the inflating agent of step (1);
   (3) subjecting the tire to a condition of usage to thereby ascertain the durability of the tire;
   (4) adjusting the durable results obtained in step (3) to thereby compensate for the amount of oxidant of step (1), so as to ascertain the true durability of the tire.

2. The method of claim 1, wherein the inflating agent is a mixture of oxygen and nitrogen and the oxygen is present in the amount of more than 0% and less than 100%.

3. The method of claim 2 wherein the oxidation reaction within the tire due to the presence of the oxidant is used to simulate climatic conditions other than that of the area and season of the year where the tire is evaluated.

4. The method of claim 1 wherein the tire of step (2) includes a multiplicity of tires each having a different concentration of oxidant contained therein with respect to each other; and step (3) provides a dictionary of stored terms relating the effect of the oxidant upon the durability of the tires; whereby: additional tires may be rapidly evaluated for their durability by utilizing varying concentrations of oxidant as the inflating agent, to thereby provide a means of controlling the manufacture of tires.

5. The method of claim 4 wherein the oxidation reaction within the tire due to the presence of the oxidant is used to simulate climatic conditions other than that of the area and season of the year where the tire is evaluated.

6. The method of claim 4 wherein the test is conducted upon an indoor test wheel.

7. The method of claim 4 wherein the test is conducted by driving the tire upon a surface provided on the ground.

8. The method of claim 1 wherein the tire of step (2) includes a series of screened tires each having a different percentage composition of oxidant therein with respect to the remaining tires of the series; and further including the steps of:
   (5) arranging the data obtained in step (3) to provide a dictionary of stored terms relating the effect of the percentage composition of oxidant upon durability of the tires; and
   (6) evaluating additional tires inflated with high concentrations of oxidant to thereby enable testing the additional tires in the minimum amount of usage to thereby rapidly ascertain the durability.

9. The method of claim 1 wherein the oxidative degradation of the tire is controlled by adjusting the percentage composition of oxidant contained in the fill gas.

10. The method of claim 1, wherein step (2) includes a first series of tires including an oxidant as the inflating agent and a second series of tires includes an oxidant and a diluent as the inflating agent, and
    step (3) is carried out to simultaneously provide a dictionary of stored terms with respect to the second series of tires to thereby permit the first series of tires to be evaluated for their durability in a minimum amount of usage.

11. The method of claim 1 wherein the inflating agent of step (1) is comprised of a mixture of gases including carbon dioxide, nitrogen, and the rare gases.

12. The method of claim 1, and further including the step of:
    (5) providing a dictionary of stored terms using the data obtained in step (3) and relating the effect of the oxidant upon the durability of the elements of a tire, whereby:
    the elements of a tire can be evaluated to rapidly ascertain their durable properties, to thereby enable the control of manufacture of tires.

13. A method of controlling the durability of a pneumatic tire comprising the steps of:
    (1) inflating the gas chamber of the tire with a compressible fluid;
    (2) reducing the pressure of the compressible fluid contained within the gas chamber of the tire to a value which is below the final inflation pressure;
    (3) inflating the tire to a final inflation pressure by adding an inflating agent to the gas chamber of the tire which changes the percent composition of oxygen contained within the gas chamber to a value which is greater than 0%.

14. The method of claim 13 wherein the compressible fluid of step (1) is compressed air.

15. The method of claim 13 wherein the inflating agent of step (3) includes an inert gas.

16. The method of claim 13 wherein the inflating agent of step (3) includes carbon dioxide, nitrogen, and the rare gases.

17. The method of claim 13 wherein the compressible fluid of step (1) is air and the inflating agent of step (3) is oxygen.

18. The method of claim 13 wherein the compressible fluid of step (1) and the inflating agent of step (3) are each a mixture of gases including carbon dioxide, nitrogen, and the rare gases.

19. The method of claim 13 wherein the compressible fluid of step (1) is an inert, and the inflating agent of step (3) is air.

20. The method of claim 13 and further including:
    (4) measuring the tire to ascertain the imperfections therein;
    (5) subjecting the tire to a condition of usage to ascertain the durability thereof;
    (6) comparing the results of step (5) to the results obtained in step (4) to thereby ascertain the true maximum durability of the tire.

21. The method of claim 20 wherein step (5) is carried out to provide the durability of the elements of a tire.

22. The method of claim 13 wherein the inflating agent of step (3) is obtained by the step of:
    burning atmospheric air together with a hydrocarbon in a ratio to thereby provide a mixture comprised essentially of carbon dioxide, nitrogen, and the rare gases.

23. The method of decelerating the failure pattern of the elements of a pneumatic tire comprising the step of inflating the gas chamber of the tire with air, and adding an inert gas to the gas chamber.

24. The method of controlling the durability of a pneumatic tire comprising the steps of:
    (1) establishing a pressure of a gas within the gas chamber of a tire which is less than the ultimate pressure to be used;
    (2) diluting said gas by inflating the tire to the ultimate pressure with a gas free of oxygen.

25. A method of determining the durability of the elements of a tire comprising the steps of:
    (1) placing the tire on a non-uniformity measuring means to thereby determine the non-uniformity of the tire;
    (2) inflating the tire with an inflating agent having more than 0% oxygen therein;
    (3) using the tire in a manner to lower its durability;
    (4) comparing the effect of step (3) upon the elements of the tire at a point about the circumference of the tire where the results of step (1) indicate a maximum rate of change in tire non-uniformity with respect to a point about the circumference of the tire where the results of step (1) indicates a minimum rate of change in tire non-uniformity, to thereby select the most probable point of failure of the tire elements about the tire circumference as compared to the least probable point of failure about the tire circumference.

26. The method of claim 25, and further including the steps of:
    (5) preparing a second tire of different design;
    (6) measuring the second tire to thereby determine the non-uniformity thereof;
    (7) subjecting the second tire to a condition of usage;
    (8) recording the effect of step (7) upon the elements of said second tire at a point about the tire circumference where the maximum rate of change in non-uniformity occurs;
    (9) comparing step (8) with step (3) to thereby enable selection of the tire element exhibiting the superior durability.

27. A method of determining true wear differences for various and distinct tread arcs of the 360° circumference of a tire, wherein a plurality of different tread compounds ranging from two to ten are placed adjacent each other upon a single tire, comprising the step of:
    (1) measuring the radial and lateral force variations within each tread arc as a subfunction of the whole radial and lateral force variation within the 360° circumference of a predetermined number of whole tread tires;
    (2) wearing away at least a portion of the tread wearing compound;
    (3) measuring the varying rates of wear around the 360° circumference of said tires to thereby ascertain the effect of said force variations upon the wear susceptibility of said tread arcs of said predetermined number of tires;
    (4) storing the data obtained in steps (1) and (3) to provide a dictionary of the effect of said force variations upon the wear susceptibility of said predetermined acrs upon said predetermined number of tires;
    (5) measuring the force variations in said tread arcs in said tire;
    (6) comparing the force variations of said tread arcs to said stored data to thereby non-destructively determine the proper correlative constants to employ to determine the true individual tread loss values of each tread arc separate and distinct from the losses attributable to the dynamic flexibilities of each individual tread arc.

28. The method of claim 27, and further including the step of:
    (7) inflating the first said tire and the said second tire with a predetermined amount of oxygen to thereby change the amount of usage normally required to evaluate the tires.

29. A method of controlling the durability of the elements of a pneumatic tire comprising the step of:
    (1) inflating the air chamber of the tire with flue gases obtained from a combustion process to thereby essentially prevent oxygen from flowing from the gas chamber into the elements of the tire; said flue gases being comprised essentially of a mixture of carbon dioxide, nitrogen, and the rare gases.

30. The method of accelerating the failure pattern of the elements of a pneumatic tire comprising the step of inflating the tire with an inflating agent comprised of essentially commercially pure oxygen.

31. The method of claim 30 wherein the oxidation reaction within the tire due to the presence of the oxidant is used to simulate climatic conditions other than that of the area and season of the year where the tire is evaluated.

References Cited

UNITED STATES PATENTS 1,685,454   9/1928   Johnson.

FOREIGN PATENTS 955,081   1/1950   France _____ 73—8

OTHER REFERENCES

G. G. Richey et al.: Proceedings of International Rubber Conference, November 1959, pp. 104–110.

S. CLEMENT SWISHER, Primary Examiner

U.S. Cl. X.R.

73—432